March 16, 1971 S. BOEHM 3,570,130
HOLDING DEVICE FOR SURVEYING INSTRUMENTS
Filed Dec. 4, 1968
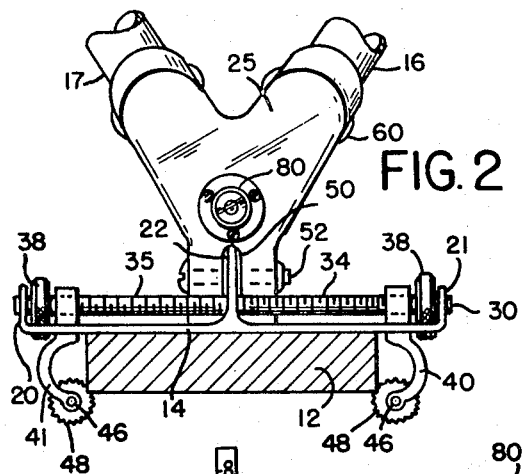
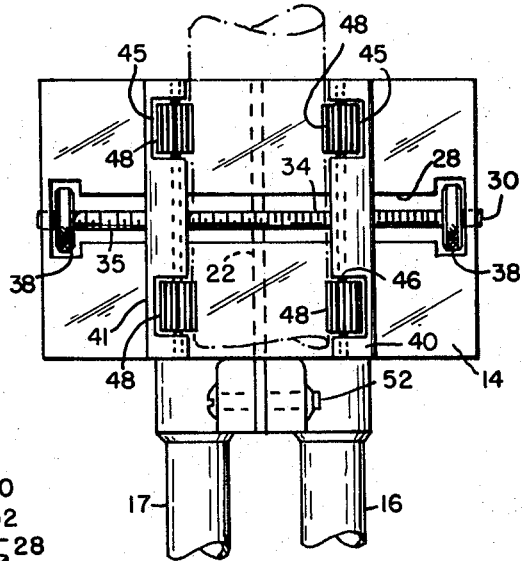
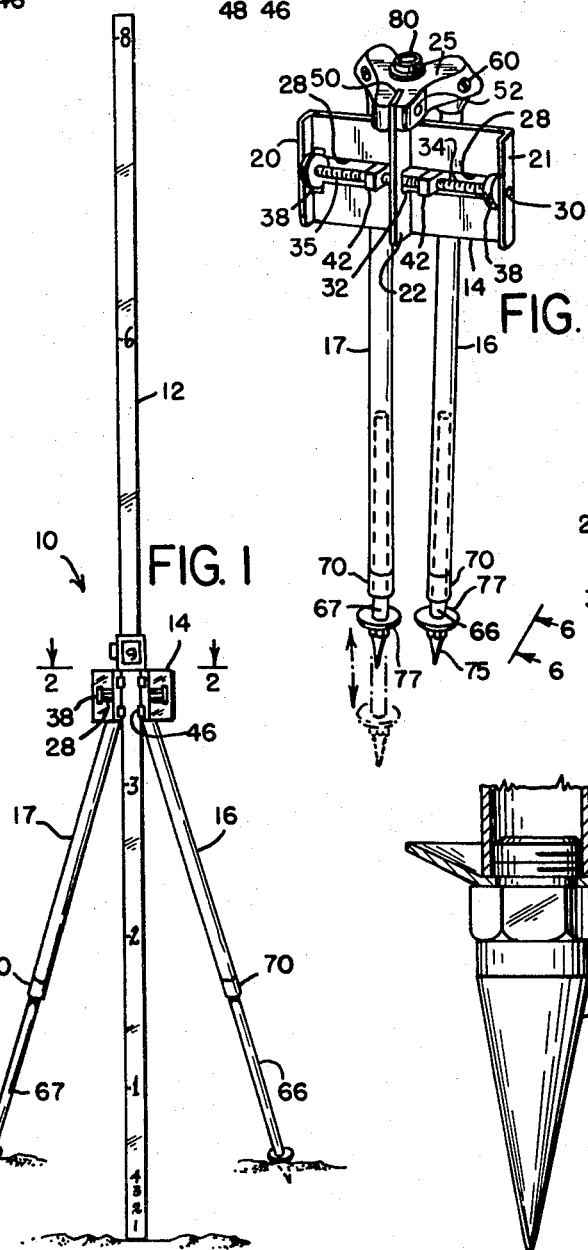
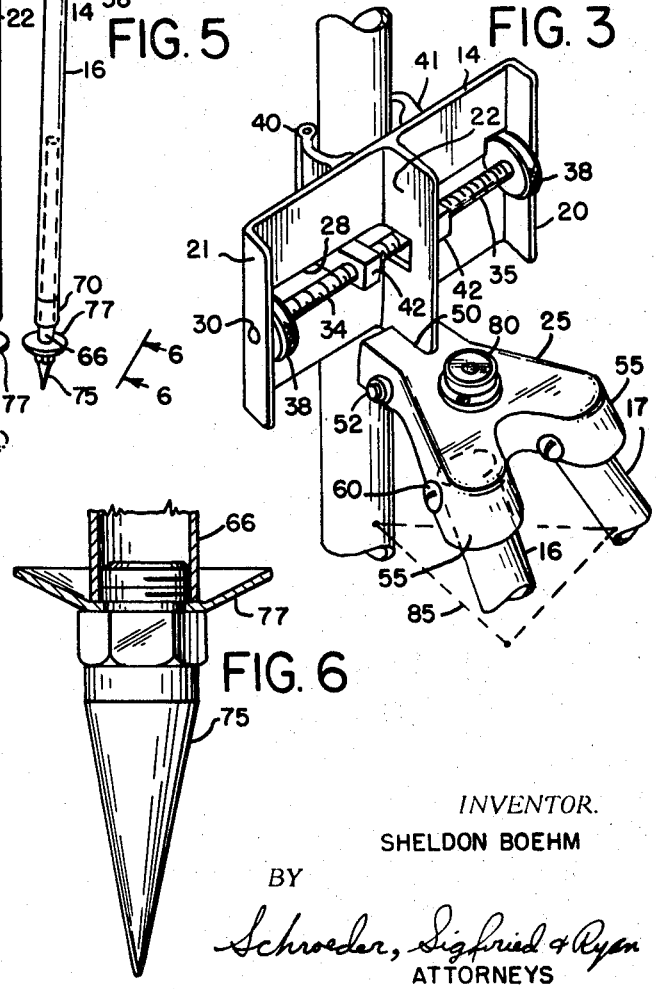
INVENTOR.
SHELDON BOEHM
BY
Schroeder, Sigfried & Ryan
ATTORNEYS United States Patent Office 3,570,130
Patented Mar. 16, 1971

3,570,130
HOLDING DEVICE FOR SURVEYING
INSTRUMENTS
Sheldon Boehm, 5405 Queen Ave. S.,
Minneapolis, Minn. 55410
Filed Dec. 4, 1968, Ser. No. 781,015
Int. Cl. G01c 15/06
U.S. Cl. 33—74                                    8 Claims

ABSTRACT OF THE DISCLOSURE

A holding device for surveying instruments and, in particular, sighting instruments such as a range pole or a level rod. The holding device includes a mounting bracket for the rod to be supported which clamps the rod by means such as to leave the front face substantially unobscured and which has a pair of adjustable legs thereon which cooperate with the surveying rod or range pole to form a tripod type support and which legs are adjustable to support the instrument or rod in a reference position.

My invention relates to improvements in the field or surveying and more particularly to an improved instrument holding device. Supports for range poles, targets and the equivalent surveying instruments have previously been employed. In the past, these have been complex structures which have been cumbersome to use and which generally required the presence of an operator, such as a rodman, at all times.

In the present invention, an improved holding device for surveying instruments is provided which may be adjusted to hold a sighting rod, such as a range pole or surveying rod, in a reference position accurately after set up. The improved holding device includes a mounting bracket for the rod which is adjustable to securely mount any size or shape pole or surveying rod without damage to the same with a mounting bracket including a pair of legs which cooperate with the rod or pole to form a tripod type support for the pole or rod and to hold the same in vertical position without further adjustment or support. The improved holding device includes a level as a reference such that the sighting rod may be placed in a desired position and left unattended thereby freeing the need or use of a rodman to hold such a pole or instrument in position. The improved holding device is relatively lightweight and is collapsible such that it may be carried to sites of usage without adding significant bulk or weight to the surveyors load and may be set in place for usage throughout extended periods without disturbing a reference obtained therefrom.

Therefore, it is the principal object of this invention to provide an improved holding device for surveying instruments.

Another object of this invention is to provide a holding device for surveying instruments such as range poles or level rods which may be set in place accurately and left unattended.

A further object of this invention is to provide an improved holding device which is easy to set up and which will accurately locate the surveying device for usage.

These and other objects of this invention will become apparent from a reading of the attached description, together with the drawings wherein:

FIG. 1 is a perspective view of the improved holding device in usage;

FIG. 2 is a sectional view of the holding device of FIG. 1 taken along the lines 2—2 therein;

FIG. 3 is a perspective view of a portion of the improved holding device showing the arrangement of parts;

FIG. 4 is a front elevation view of the improved holding device with parts broken away;

FIG. 5 is a perspective view of the improved holding device in a storage or transport position; and FIG. 6 is a sectional view of the improved holding device of FIG. 5 taken along the lines 6—6 therein.

My improved holding device for surveying instruments is shown generally in FIG. 1 at 10 in connection with a surveying or level rod, indicated generally at 12. The holding device is comprised generally of an instrument holding bracket or mounting plate, indicated generally at 14, having legs 16, 17 associated therewith which form with the device to be held, such as the level rod or a range pole, a tripod construction for rigidity and stability. The instrument holding bracket or mounting plate is of metallic channel-like construction with end flanges 20, 21 and a centrally located flange 22 upon which is mounted a generally Y-shaped bifurcated leg mounting bracket 25. The instrument mounting plate 14 has a slot 28 extending longitudinally across the central portion of the plate and a threaded shaft 30 is mounted adjacent this slot with the shaft extremities being journaled into flanges 20, 21 and extending through a slot 32 in the central flange 22. The shaft 30 has two sets of threads thereon which are oppositely pitched, such as is indicated at 34, 35, and the central portion of the shaft adjacent the slot 32 is without threads. Pinned to the extremities of the shaft adjacent the flanges 20, 21 are knurled rotating knobs 38 by means of which the shaft may be manually rotated.

On one surface of the mounting plate 14 opposite the flanges 20, 21 and 22 are positioned a pair of clamp-like gripping plates 40, 41 which are curved along their extent and include a transversely extending flange portion 42 having threaded aperture therein. The gripping plates 40, 41 are generally of the same width as the mounting plate 14 and bear against the plate with the flange portions 42 extending through the slot 28 to be moved and guided therein. The flanges are threaded onto the shaft 30 in such a manner that the oppositely pitched threads 34, 35 will cause the plates to move toward one another or away from one another simultaneously to perform a gripping action or releasing action on the instrument pole to be mounted in the holding device. The gripping plates 40, 41 which are curved along their extent, have notches 45 at their extremities opposite the flange 42 and a suitable journaling pin 46 is positioned in this portion of the flange to frictionally mount rubber rollers or holding members 48 which are generally cylindrical in form and fit within the notches 45 to perform a gripping action on the instrument pole or level rod, such as is indicated at FIG. 2. The rod 12 will be disposed flush against the flat surface of the plate 14 and the gripping rollers 48, which are generally serrated on a peripheral surface, will engage the corners or surfaces of the instrument to be held to secure the same in the holding device. This can be adjusted by rotation of the knobs 38 on the shaft 30 to adjustably position the gripping flanges 40, 41.

The centrally located flange 22 on the opposite side of the mounting plate 14 mounts the leg mounting bracket 25 which is generally Y-shaped or bifurcated in form having a notched surface 50 therein which fits over a portion of the flange 22 with a suitable pin 52 extending through this portion of the flange 22 and the leg mounting bracket to pivotally mount the same thereon. As will be seen in the drawings, this flange is of slightly longer dimension than the flanges 20, 22 to permit pivotal movement of the flange relative to the plate 14 for storage and usage purposes.

The leg mounting bracket 25, as will be best seen in FIG. 3, has angularly sloped leg holding surfaces 55 in which are positioned the extremities of the legs 16, 17 with the legs being suitably pinned or journaled therein through suitable pin means, indicated at 60. In one position of the pivotal movement, the edges of the legs bear against the sloped surfaces 55 of the leg mounting bracket to incline the legs 16, 17 at an angle to the top surface or general extent of the leg mounting bracket 25 such that the leg extremities will be pivoted away from one another to form a generally triangular construction or support with the instrument to be held in the gripping means of the mounting plate 14. The legs, however, may be pivoted normal to the extent of the leg mounting bracket 25 for storage purposes, such as is indicated at FIG. 5. The legs 16, 17 include lower telescopic parts 66, 67 which fit into the upper leg parts and are held in position therein by means of pressure type clamps 70 which are threadedly mounted on an upper leg part 16, 17 and clamp the lower leg parts in telescopic position therein to permit adjustment of the leg length. The extremities of the leg 66, 67 include stake members 75 which thread into the lower extremity of the same, as indicated in section at FIG. 6, with circular disc-like members 77 being positioned therebetween to limit the depth of movement of the stakes into the ground.

Also positioned on the upper surface of the leg mounting bracket or flange 25 is a circular bubble type level, indicated at 80, which serves as a reference for aligning the level rod or range pole plumb when the mounting bracket is positioned to secure the same in an elevated position. The legs 16, 17 with their telescopic extension 66, 67 because of their location on the bifurcated leg mounting bracket 25, will form with the level rod by the gripping plates 40, 41 on the mounting plate 14 a generally triangular configuration, such as is indicated in dotted lines at 85 in FIG. 3.

The improved holding device for surveying instruments is used by placing a range pole or level rod between the gripping members 40, 41 and in contact with the surface of the mounting bracket 14 adjacent the same such as to align the mounting bracket with the general extent of the rod. The leg mounting bracket 25 is pivoted to a position where it is located opposite of the surface upon which the gripping members move and such that the legs extend away from the instrument rod such that a generally tripod configuration will be obtained with the rod being held forming one leg of the same. The legs may be extended by loosening the pressure connections 70 such that the legs will contact the ground and be inserted into the ground for stability purposes. In this position, the legs will be pivoted out against the inner surface of the bifurcated extremities 55 of the leg mounting bracket to be disposed at an angle to the extent of the rod being held. This will provide the generally triangular or tripod type support. By adjusting leg length with the end of the instrument rod over the position of reference, the mounting bracket may be moved to a reference position in which the bubble level will be centered causing the range pole or level rod to be held in a plumb or vertical position. When so assembled and positioned, the holding device with the level rod or range pole secured therein may be left unattended and will maintain an accurate plumb reference for sighting purposes over extended periods of time. Thus, with the holding device, the levelling rod or range pole acts as the third leg of the tripod to secure the holding device in a rigid and permanent relationship. The adjustability of the gripping surface thereon permits mounting or handling of all types of surveying instruments, rods or devices of this type which may vary from generally wide rectangular relationships to cylindrical range poles. Further, such instruments are gripped on opposite sides so as not to include this portion of the rod and present a blind spot to a person making sightings. It provides an ideal tool for construction personnel as well as surveyors in that it eliminates the necessity of having a rodman or person holding the desired instrument level while sightings are being taken. Thus, for example, an earth moving foreman may check ground level grades by himself merely by setting the level rod in position in a desired location and referenced to vertical so that he may leave the level rod unattended and perform his sightings through a transit or surveyor's level from a different location. Thus, it will eliminate or free a person normally assigned to holding the instrument level during sightings to perform other duties. It is further applicable for spot checks of elevation or as a reference over extended periods of time without the requirement of a separate person to hold the rod. More particularly, this improved holding device permits an accurate location of the range pole or level rod in a plumb position and more firmly secured therein than can be obtained by a person since the holding device, when set in place, will not move. Thus, it is a labor saving device in the surveying field which is simple to use and maintain. Further, it is a simplified structure which may be readily transported and, as will be seen in FIG. 5, the leg mounting bracket 25 or mounting plate 14 will be pivoted through 180 degrees relative to one another and the legs collapsed to provide a compact structure for storage or transportation purposes.

What is claimed is:

1. A holding device for surveying instruments comprising, a channel-like mounting bracket, a pair of instrument gripping means mounted on flange edges of said bracket and projecting from one surface thereof for movement toward and away from one another, a leg mounting bracket connected to an intermediate flange on the channel-like mounting bracket and projecting from the opposite surface thereof, and a pair of legs connected to the leg mounting bracket and extending at an angle therefrom, said legs being slidably adjustable to vary the length of the same and cooperating with a rod-like instrument adapted to be held by the gripping means to form a tripod type support to hold the rod-like instrument in a reference position.

2. The holding device for surveying instruments of claim 1 in which the pair of gripping means of the channel-like mounting bracket includes a threaded shaft journaled in the edge flanges of the bracket and a pair of flange type gripping members having a threaded aperture therethrough which mount on the shaft and move selectively toward and away from one another with selective direction of rotation of the shaft.

3. The holding device for surveying instruments of claim 2, and including bubble level means positioned on one of said mounting brackets for indicating a reference position of the legs to establish a reference position for the instrument.

4. The holding device for surveying instruments of claim 2 in which the pair of legs are pivotally mounted on the leg mounting bracket and movable to a fixed angular relationship relative to the leg mounting bracket.

5. The holding device for surveying instruments of claim 2 in which each of the legs of the pair include telescopic parts which adjust in length and include friction means to hold the adjusted leg in a rigid position.

6. The holding device for surveying instruments of claim 2 in which the leg mounting bracket is pivotally mounted on the plate-like mounting bracket and is adapted to pivot through 180 degrees from a fixed position of usage on the plate mounting bracket to a position of storage.

7. The holding device for survewing instruments of claim 2 in which the gripping means on the channel-like mounting bracket includes a means positioned on said shaft to be manually gripped and rotated for adjustment of the gripping means.

8. The holding device for surveying instruments of claim 7 in which the flange type gripping members include journaled rubber gripping surfaces adapted to grip a rod-like surveying instrument and secure the same in the gripping means.

References Cited
UNITED STATES PATENTS

| | | | |
|---|---|---|---|
| 2,980,376 | 4/1961 | Westerfield | 248—163X |
| 3,026,625 | 3/1962 | Carey | 33—73(A)X |
| 3,077,035 | 2/1963 | Hackney | 33—74(B) |
| 3,162,410 | 12/1964 | Owens | 248—46 |

FOREIGN PATENTS

| | | | |
|---|---|---|---|
| 111,426 | 6/1900 | Germany | 33—74(A) |
| 364,986 | 12/1922 | Germany | 33—74(A) |
| 99,345 | 1/1962 | Norway | 33—74(A) |

ROBERT B. HULL, Primary Examiner

U.S. Cl. X.R.

33—207; 248—173, 187, 411